Jan. 6, 1953 T. W. JOHNSON 2,624,255
TRACTOR MOUNTED CULTIVATOR
Filed Sept. 11, 1946 4 Sheets-Sheet 1

INVENTOR
THEODORE W. JOHNSON
BY
ATTORNEYS

INVENTOR
THEODORE W. JOHNSON
BY
ATTORNEYS

Jan. 6, 1953 T. W. JOHNSON 2,624,255
TRACTOR MOUNTED CULTIVATOR
Filed Sept. 11, 1946 4 Sheets-Sheet 3
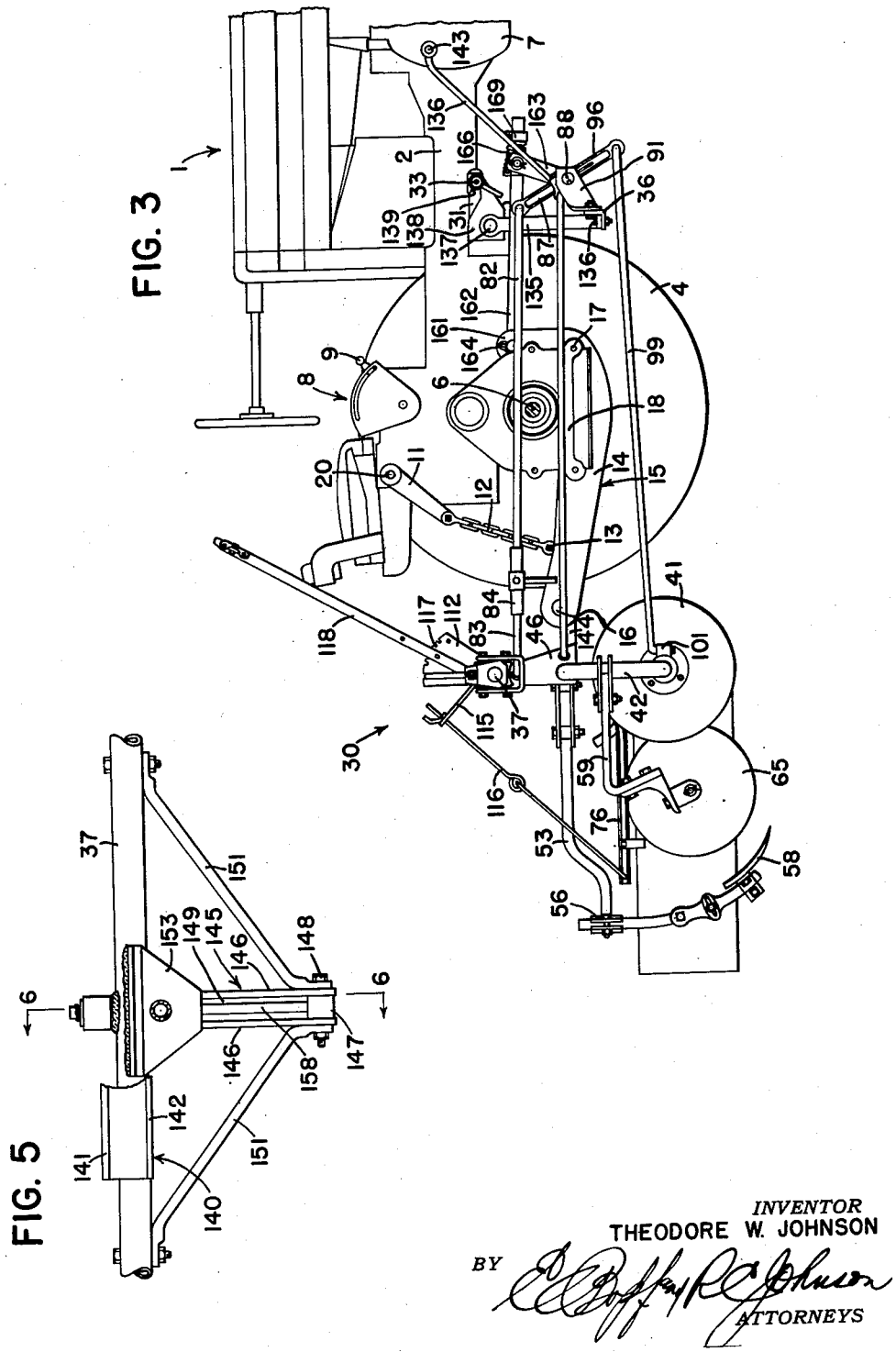
INVENTOR
THEODORE W. JOHNSON
BY
ATTORNEYS

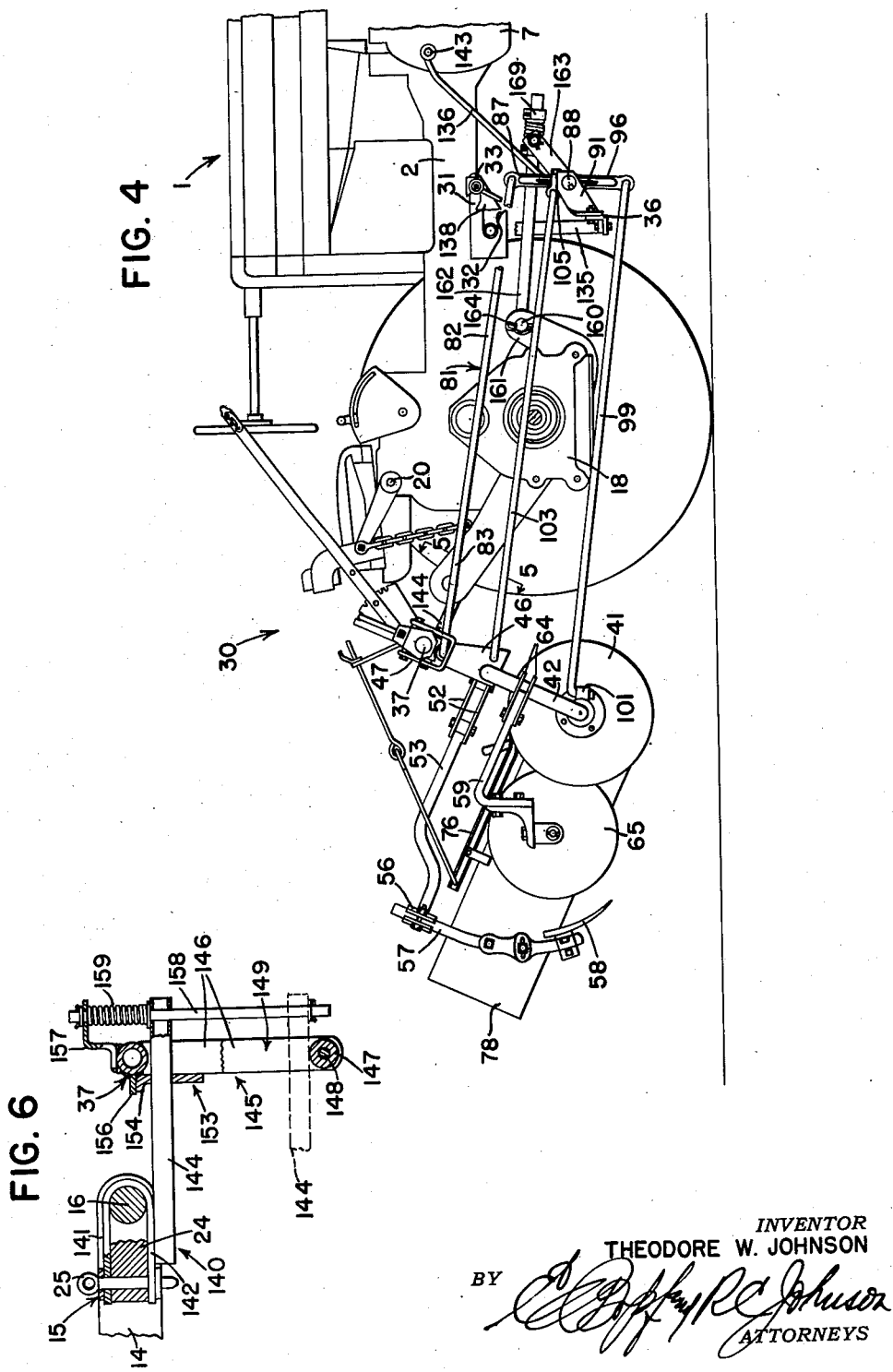

Patented Jan. 6, 1953

2,624,255

UNITED STATES PATENT OFFICE 2,624,255

TRACTOR MOUNTED CULTIVATOR

Theodore W. Johnson, Moline, Ill., assignor to Deere & Company, Moline, Ill., a corporation of Illinois Application September 11, 1946, Serial No. 696,309

13 Claims. (Cl. 97—47)

The present invention relates generally to agricultural implements and more particularly to cultivators and similar implements adapted to be mounted on a farm tractor and propelled thereby.

The object and general nature of the present invention is the provision of a wheel supported lister cultivator or the like which is adapted to be connected to a tractor in generally trailing relation and controlled by suitable connections with the tractor but which is capable of being attached to or detached from the tractor easily, quickly and conveniently. Further, it is a feature of this invention to provide a lister cultivator or similar implement especially adapted to be controlled as to depth of operation and raised and lowered into and out of a transport position by suitable connections with the vertically swingable power-actuated drawbar of the tractor. It is also a feature of this invention to provide new and improved means for stabilizing the lister cultivator gangs and to provide new and improved means cooperating with the stabilizing mechanism for raising the implements into a transport position.

Another important feature of the present invention is the provision of an agricultural implement of the type that is adapted to be hitched to the tractor having a power-operated unit movable through two ranges, with connections whereby movement through one range effects an adjustment of the depth of operation while movement through the other range provides for bodily lifting the implement units out of their operating position. Another important feature of the present invention is the provision of new and improved stabilizing means for an integral lister cultivator, with operating connections associated with the stabilizing bar so that in normal operating position the bar is capable of pivoting about a generally longitudinal axis relative to the tractor, but which may be arranged for moving the cultivator units into a transport position in which pivoting of the stabilizing bar about a fore and aft or longitudinal axis is limited so as to prevent undesired swinging or oscillation of the units during transport.

These and other objects and advantages of the present invention will be apparent to those skilled in the art after a consideration of the following detailed description of one preferred embodiment, taken in conjunction with the accompanying drawings illustrating such embodiment.

In the drawings:

Figures 1 and 2 comprise a perspective view of a lister cultivator in which the principles of the present invention have been incorporated, the cultivator being shown with the several parts in the positions they occupy when the implement is attached to a tractor;

Figure 3 is a side view of the implement, showing the same as hitched to a tractor and with the soil working tools in operating position;

Figure 4 is a view similar to Figure 3, showing the tools in their raised position;

Figure 5 is a fragmentary view, taken generally along the line 5—5 of Figure 4;

Figure 6 is a section taken generally along the line 6—6 of Figure 5.

Figure 1:
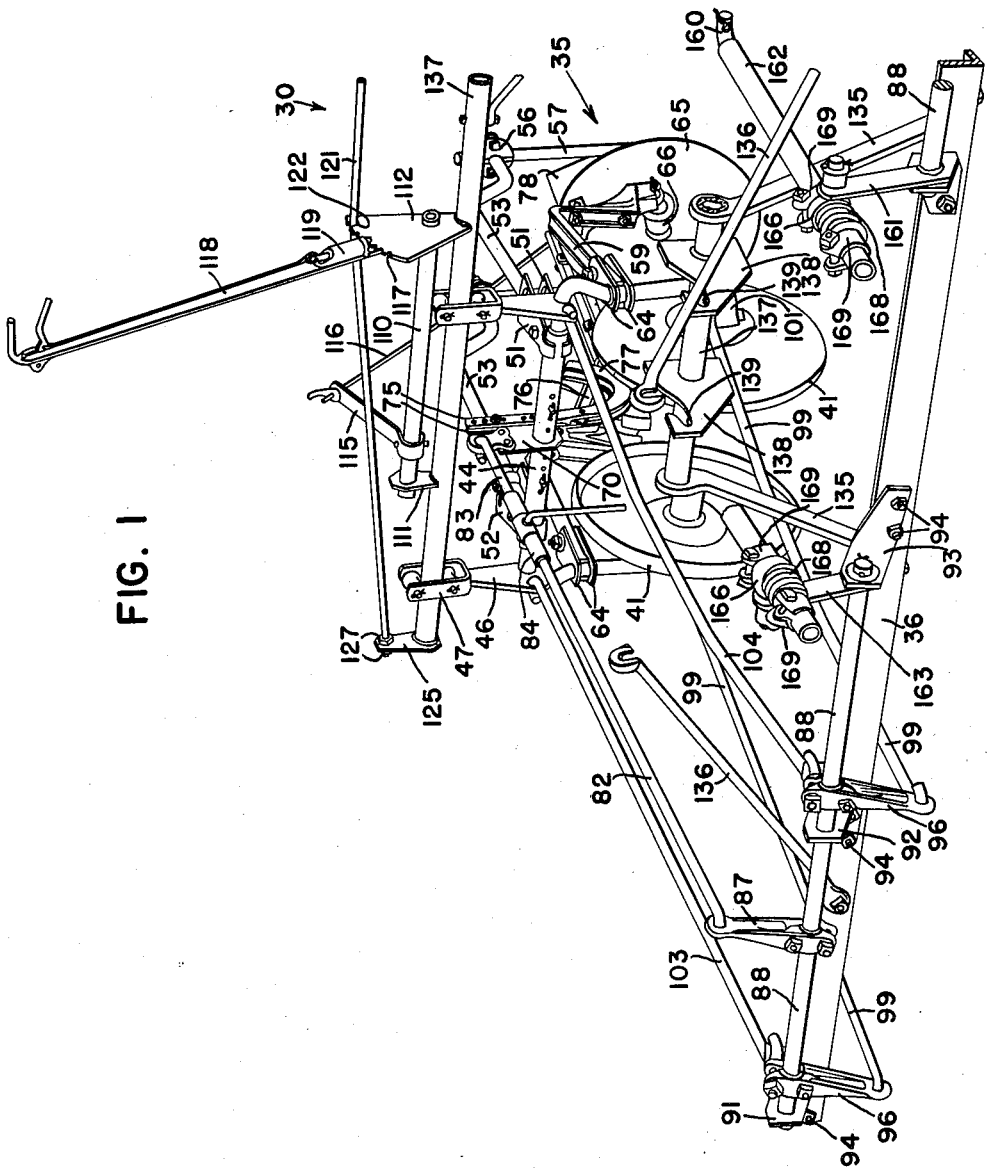

Referring now to the drawings, particularly Figure 3, the reference numeral 1 indicates a farm tractor of the type having a generally longitudinally extending relatively narrow body 2 and supported on front wheels (not shown) and laterally spaced rear traction wheels 4 journaled for rotation in a rear axle structure in which axle shafts 6 are rotatable. The tractor 1 includes a power plant 7 and a power lift unit 8 of the hydraulic type, which includes suitable valve mechanism 9 and other parts, such as a pair of lift arms 11 and links 12 connecting the arms 11 to lugs 13 formed on the side members 14 of a generally vertically swingable tractor drawbar or bail member 15. The latter is preferably in the form of a U-shaped member, considered as a whole, and includes a rear transverse section 16 which may be formed of round stock. The side members 14 may be of any suitable construction and are pivoted at their front ends, as at 17, to drop housings 18 which form a part of the tractor rear axle structure. Preferably, the rear portion 16 of the tractor drawbar is welded or otherwise permanently secured to the side members 14 of the tractor drawbar. The two power lift arms 11 are clamped or otherwise fixed in any suitable manner to the ends of a power lift rockshaft 20 which forms a part of the hydraulic power lift unit 8. As best shown in Figure 6, a lug 24 is welded or otherwise permanently fixed to the central section 16 of the tractor drawbar 15 and is apertured to receive a connecting pin 25 which serves to connect the lug 24 to the attachment member of any one of a number of different implements. For example, the tractor just described is adapted to receive a two-row integral lister cultivator indicated in its entirety by the reference numeral 30. The implement 30 forms the principal subject matter of the present invention. The tractor 1 is provided with a pair of attachment plates 31 (Figure 3), each attachment plate 31 having a notch 32 and carrying a wing nut 33. The attachment plates 31 normally form a part of the tractor 1 and provide for the quick and ready attachment and detachment of implements and/or implement parts.

Figure 2:
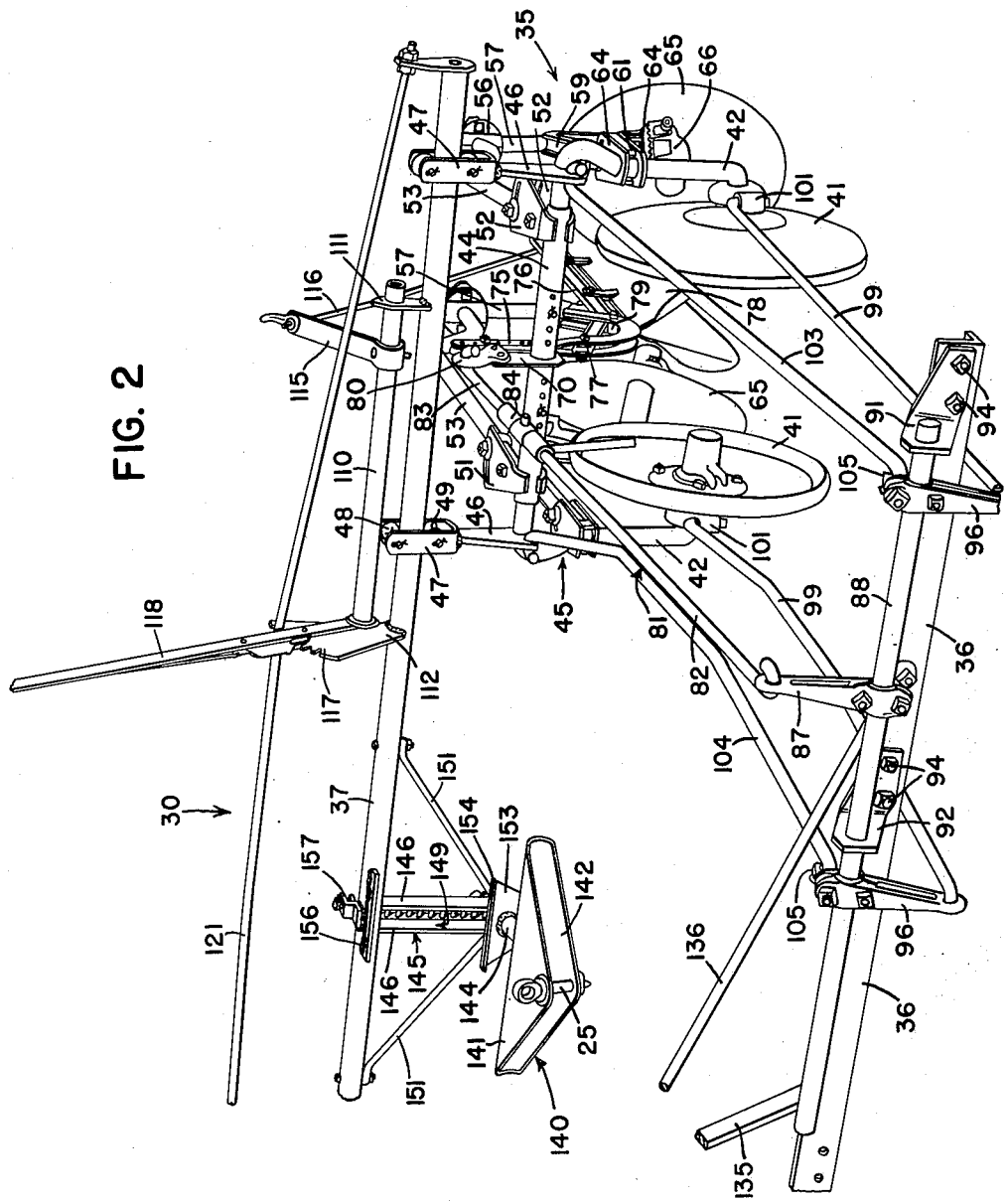

As best shown in Figures 1 and 2, the lister cultivator 30, with which the present invention is more particularly concerned, comprises a pair of lister cultivator units or gangs 35, a forward draft bar 36, preferably in the form of an angle, adapted to be fixed to the tractor body forward of the rear traction wheels 4, and a rear stabilizing bar 37, together with appurtenant parts. Briefly, each of the lister cultivator units or gangs 35 is similar to the lister gangs shown in the U. S. Patent 2,323,683, issued to Walter H. Silver, dated July 6, 1943, to which reference may be made if necessary. Each lister gang unit includes a pair of ground wheels 41, each of which is journaled for rotation on the laterally inturned end of a standard 42 that extends generally vertically and at its upper portion has a laterally inturned end rockably received in a central sleeve 44. The cultivator gangs or units 35 are substantially identical one with the other, and therefore a description of only one unit will suffice. The standards 42 form a part of a truck frame that is indicated in its entirety by the reference numeral 45 and which includes additionally a pair of upstanding bar-receiving brackets 46. A yoke 47 at the upper end of each bracket 46 forms a bifurcated section between the two sides of which a pair of rollers 48 and 49 are mounted for rotation, with the associated end of the stabilizing bar 37 disposed therebetween. The sleeve 44 has limited rocking movement on the upper laterally inwardly extending portions of the wheel standards 42 and is operatively connected with the latter by any suitable means so as to tie the standards together to form the wheel truck or truck frame. Two pairs 51 and 52 of upper and lower plates are clamped by suitable bolt means about the sleeve 44, the plates of each of the pairs 51 and 52 of plates being spaced apart vertically to receive, respectively, a tool bar 53 therebetween. Each tool bar 53 is mounted for pivotal movement in a lateral direction and the plates 51 and 52 are provided with arcuate slots and suitable cooperating bolt means whereby the tool bars 53 may be fixed in different positions of lateral adjustment. At its rear end, each of the tool bars 53 is bent downwardly and is provided with suitable clamp means 56 by which the upper portion of an associated cultivator shank 57 is fixed thereto. Each shank 57 carries a shovel or other tool 58. A second set of tool bars 59 is included in each lister cultivator unit 35. Each bar 59 is bifurcated at its forward end, as indicated at 61, so as to at least partially embrace the associated wheel standard 42. The forward end of each bar 59 is adjustably fixed between a pair of upper and lower plates 64 which are welded or otherwise fixed to the associated wheel standard 42. The rear end of each bar 59 is bent downwardly and at its rear end carries a disk 65 through suitable bearing means 66.

A plate 70 is secured, as by welding or the like, to the intermediate portion of the rockable sleeve 44. The plate 70 is extended rearwardly and is provided with one or more bolt holes to receive bolt means that secures a pair of shield-supporting strap members 75 thereto. A shield arm 76 is pivoted, as at 77, to each pair of straps 75 and extends generally rearwardly, carrying a plant-protecting shield 78. Suitable stop means 79 (Figure 2) is provided for limiting the downward swinging of the shield bar 76 about the pivot bolt 77.

Each of the lister cultivator units 35 is constructed as described above, and each is connected to the associated end of the front draft bar 36 by means that accommodates both lateral and vertical swinging. Preferably, the connections established between the draft bar 36 and each of the units 35 include a plurality of generally parallel links. Specifically, the upper end of the arm 70 is provided with an apertured portion 80 to receive the rear end of an upper link 81, which may be made up of two adjustably connected sections 82 and 83 connected together by adjustable means 84, and the forward end of the link member 81 is connected to the upper end of an arm 87 which is fixed to the central portion of a rockshaft 88. Each rockshaft 88 is mounted for rocking movement in three brackets 91, 92 and 93 carried, as by bolt means 94, on the front draft member 36. A pair of depending arms 96 is also fixed to the rockshaft 88 and each arm 96 is connected by a link 99 to the lower end of the associated wheel standard 42, preferably by means of a swivel casting 101 which forms a part of the bearing structure by which each bell wheel 41 is journaled for rotation on the associated wheel standard 42. A second pair of links 103 and 104 is connected between the brackets 46 and a pair of clips 105 which form a part of the arms 96 and which are disposed closely adjacent the axis of rotation of the associated rockshaft 88. Thus, whenever the shaft 88 is rocked in one direction or the other, the tool bars 53 and 59 and the wheel standards 42 are tilted in one direction or the other so as to raise or lower the tools with respect to the ground surface. Also, of course, the shield 78 is raised or lowered since the shield supporting straps 75 tilt with the central bracket member 70. The means for rocking the two rockshafts 88 will be described below.

The two lister gangs 35 are stabilized by a stabilizing or equalizing bar 37 mentioned above. By virtue of the rollers 48 and 49 and associated parts each unit 35 may shift laterally inwardly or outwardly along the stabilizing bar 37 which is thus supported directly upon the two gangs or units 35. The shields 78 are adapted to be raised or lowered relative to the tools 58 and 65 by means of a pair of rockshafts and associated parts supported directly on the stabilizing bar 37. Each shield adjusting rockshaft is indicated by the reference numeral 110 and is mounted for rocking movement in a pair of brackets 111 and 112 that are fixed, as by welding, to each end portion of the stabilizing bar 37. An arm 115 is fixed to each rockshaft 110 and is connected by means of an adjustable link 116 to the rear end of the associated shield supporting bar 76. The inner bracket 112 is preferably in the form of a notched sector, the notched portion being indicated by the reference numeral 117. A hand lever 118 is fixed to the inner end of each shield adjusting rockshaft 110 and carries conventional detent mechanism 119 which cooperates with the notches 117. The stabilizing bar 37 is reenforced by a truss rod 121 which extends over the upwardly extending brackets 112, being seated in notches 122 therein, and each end of the stabilizing bar 37 carries a bracket 125 which receives the associated end of the truss rod 121, as best shown in Figures 1 and 2. Lock nuts 127 provide for adjusting the tension in the truss rod 121. It will be noted that each rockshaft 110 is mounted in its associated brackets 111 and 112 in such spaced relation with respect to the pipe member making up the stabilizing bar 37 that lateral shifting movement of the laterally inner pair of rollers 48 and 49 and associated parts is readily accommodated.

Reference was made above to the fact that the tractor drawbar 15 is swingable generally vertically under the control of the power lift unit 8 and that the tractor 1 is provided with attachment brackets 31. The lister cultivator described above is particularly adapted to be connected to the attachment brackets 31 and the tractor drawbar 15, and the means to this end will now be described.

The front draft bar 36, which preferably is in the form of an angle, carries a central attachment structure which comprises a pair of upstanding arms 135 secured, as by bolts, to the horizontal flange of the angle 36 and at their upper ends the arms 135 are apertured and welded to a round bar 137 which is adapted to be disposed in the rear notches of the attachment plates 31 on the tractor. A pair of attachment plates 138 are fixed, as by welding, to the bar 137 in laterally spaced relation and each plate 138 is provided with a notch 139 adapted to receive the wing nut 33. Forwardly and laterally inwardly extending brace rods 136 are bolted at their lower ends to the outer portions of the angle 36 and are slotted at their upper ends to receive attaching bolts 143 on the tractor. A rear attachment member 140 is provided for connecting the stabilizing bar 37 to the tractor drawbar 15. The member 140 includes a U-shaped plate having apertured upper and lower sections 141 and 142, the apertures serving to receive the connecting pin 25. The member 140 thus serves as a forwardly facing socket member adapted to receive the transverse section 16 of the tractor drawbar, and the pin 25 is adapted to be disposed in the opening in the tractor drawbar lug 24. Extending rearwardly from and fixed rigidly to the plates 141, 142 is a central stub shaft 144 which serves as a rearwardly extending centering bar that is preferably round in section.

The rear end of the centering bar 144 is received in a slotted member 145 secured, as by welding, to the central portion of the stabilizing or equalizing bar 37. As best shown in Figures 2 and 6, the member 145 preferably is in the form of a pair of straps 146 spaced apart at their lower ends by a bushing 147 mounted on a connecting bolt 148. The space between the straps 146 forms a slot 149 in which the rear end of the centering bar 144 is disposed. The member 145 is reenforced by a pair of braces 151 secured at their outer ends to the stabilizing bar 37 and at their lower or inner ends to the lower end of the member 145 by the bolt 148. A stop plate 153 is fixed, as by welding, to the centering bar 144 forward of the member 145 and has a forwardly bent transverse upper edge 154 which is adapted, when the member 140 is raised to the upper end of the slot 149, to contact an abutment member 156 fixed, as by welding, to the central portion of the stabilizing bar 37 at the forward side thereof, above the member 146. A bracket 157 is fixed to the stabilizing bar 37 (Figure 6) and is apertured to receive a rod 158 that extends downwardly through an opening in the rear end of the centering bar 144. A compression spring 159 is confined between the bracket 157 and the rear end of the bar 144.

Referring now more particularly to Figures 3 and 4, it will be noted that the tractor drawbar 15 is provided with an upstanding arm 161 on each of the side members 14. Each of the arms 161 is connected by a forwardly extending link 162 to an arm 163 that is fixed to the inner end of the associated adjusting rockshaft 88. Preferably, the rear end of each link 162 is turned laterally outwardly, as at 160 (Figure 1), and is disposable in an opening in the drawbar arm 161, and held therein by a quick detachable pin 164 of the hairpin type. The connection between the forward end of each of the links 162 and the associated arm 163 is effected by means of a swivel 166 having an eye which slidably receives the forward end of the associated link 162. A compression spring 168 is disposed ahead of the eye section 167, and the forward portion of each link 162 receives a pair of clamp collars 169, one being disposed ahead of the spring 168 and the other on the rear side of the swivel eye.

The operation of the implement described above is substantially as follows. Figures 1–3 show the implement in an operating position. The operating depth of the shovels 58 and disks 65 is adjusted by changing the position of the tractor drawbar 15 through what may be termed a first range of movement. In this range of movement, the tractor drawbar 15 may be raised or lowered by suitable operation of the valve mechanism 9, and as the drawbar 15 is raised or lowered, the arms 161 are moved forwardly or rearwardly, such motion being transmitted to the arms 163 on the rockshafts 88 by the links 162. As the rockshafts 88 are thus rocked, the links 82 and 99 are shifted fore and aft to tilt the cultivator units 35. During this range of movement of the drawbar 15, the attachment member 140 moves with the drawbar, but the rear end of the centering bar 144 moves idly in the slot 149. When it is desired to raise the tools 35 into a transport position, the drawbar 15 is raised into its raised position, which brings the abutment plate 153 on the centering bar 144 up against the abutment plate 156 on the stabilizing bar 37 when the rear end of the centering bar 144 reaches the upper end of the slot 149. This raises the stabilizing bar 37 and the units 35 are lifted by the stabilizing bar 37 into a transport position. In the raised position, where the abutment plate 153 engages the abutment strip 156, the bar 37 is limited against pivoting about its connection with the centering bar 144, but when the parts are in their operating position, with the centering bar in a lower position in the slot 149, the stabilizing bar 37, while held by the bar 144 against lateral displacement, is permitted to pivot about a generally longitudinal axis. At the same time, the individual cultivator units 35 are permitted to shift inwardly or outwardly along the stabilizing bar 37, as ground conditions require, but the units 35 are continually maintained in upright position by the stabilizing bar 37. The spring 159 is made so that although it is not strong enough, when the centering bar 144 is raised as shown in Figure 6, to lift the bar 37 and the associated tools, the spring 159 is capable of exerting some force between the bracket 157 and the bar 144 when the latter is in its lowered position, as shown in dotted lines. Thus, any tendency for the tools 58 or 65 of one unit to swing upwardly and rearwardly, rocking the arms 87 and 96, and the associated rockshaft 88, in a clockwise direction (Figure 3) which tends to raise the tractor drawbar 15, is resisted by the spring 159 which thus acts against the stabilizing bar 37 and the other tool unit, to hold the tools of the first mentioned unit in their operating position.

When it is desired to detach the implement 30, all that it is necessary to do is to disconnect the front draft bar braces 136 at their upper ends, remove the quick detachable pins 164 and disengage the rear ends of the links 162 from the drawbar arms 161. When this is done the hitch plates 138 may be disconnected from the tractor-carried attachment plates 31, merely by loosening the wing nuts 33, after which the front portion of the cultivator drops to the ground. Then by removing the hitch pin 25, the tractor is entirely disconnected from the implement and may be driven away.

While I have shown and described above the preferred structure in which the principles of the present invention may be incorporated, it is to be understood that my invention is not to be limited to the particular details, shown and described above, but that, in fact widely different means may be employed in the practice of the broader aspects of my invention.

What I claim, therefore, and desire to secure by Letters Patent is:

1. A listed corn cultivator adapted to be connected to a tractor having rear traction wheels and a generally vertically swingable rear drawbar, said cultivator comprising a transverse draft bar, means for detachably connecting the central portion of said draft bar with the tractor forward of said rear wheels, a plurality of cultivator units swingably connected with said draft bar and disposed rearwardly of the latter, a transverse stabilizing bar having a shiftable connection with said cultivator units, and means adapted to be detachably connected with the tractor drawbar and connected with the central portion of said stabilizing bar and including a part engageable with said stabilizing bar at laterally spaced apart points when the tractor drawbar is raised for raising said stabilized bar and said units.

2. An agricultural implement adapted to be connected to a tractor having a rear generally vertically swingable drawbar, said implement comprising a transverse draft bar, means for detachably connecting said draft bar with the tractor generally forward of the tractor drawbar, a plurality of ground working units connected with said draft bar and shiftable generally vertically relative thereto, a transverse stabilizing bar extending from one unit to the other, said units being shiftable along said bar, means connecting the end portions of said transverse stabilizing bar with said implements whereby raising said stabilizing bar also raises said units, and means detachably connecting the generally central portion of said transverse stabilizing bar with said vertically swingable tractor drawbar, whereby vertical movement of the latter acts through said transverse stabilizing bar for raising and lowering said implement units.

3. An agricultural implement adapted to be connected to a tractor having a rear generally vertically swingable drawbar and a pair of laterally spaced rear traction wheels, said implement comprising a front draft bar, means for connecting said draft bar with the tractor forward of said rear wheels, a plurality of implement units disposed rearwardly of said draft bar, link means trailingly connecting said units with said draft bar, each of said units including tool means adjustable for depth of operation, means mounted on said draft bar and connected with said link means for adjusting the depth of operation of said tool means, motion-transmitting means connected with said swingable drawbar and said adjusting means for connecting said adjusting means with said generally vertically swingable drawbar, a rear transverse bar connected at its end portions with said implement units, and means connecting said rear transverse bar with the tractor drawbar, whereby the latter may act through said transverse bar to raise said tool means.

4. An agricultual implement adapted to be connected to a tractor having a rear drawbar and a pair of laterally spaced rear traction wheels, said implement comprising a front draft bar, means for connecting said draft bar with the tractor forward of said rear wheels, a plurality of implement units disposed rearwardly of said draft bar, link means trailingly connecting said units with said draft bar, each of said units including tool means adjustable for depth of operation, movable means mounted on said draft bar, means for moving said movable means, motion-transmitting means connecting said movable means with said tool means, whereby operation of said movable means serves to adjust the depth of operation of said tool means, a rear transverse bar connected at its end portions with said implement units, an attachment member adapted to be detachably connected with the tractor drawbar, and means connected to the central portion of said rear transverse bar for pivotally connecting the latter with said attachment member.

5. The combination with a tractor having a rear vertically swingable drawbar, of an implement comprising a draft bar adapted to be connected to the tractor forwardly of said drawbar, a plurality of cultivator units swingably connected in trailing relation to said draft bar, rockshaft means on said draft bar for adjusting the operating position of said cultivator units, a transverse stabilizing bar shiftably connected with said units, a connection between said rockshaft means and said drawbar whereby operation of the latter serves to adjust said units, and means for detachably connecting said stabilizing bar with the tractor drawbar whereby the latter acts through said stabilizing bar for raising all of said cultivator units out of engagement with the ground.

6. The combination with a tractor having a rear vertically swingable drawbar and means for swinging said drawbar generally vertically in two stages of movement, of an implement comprising a draft bar adapted to be connected to the tractor forwardly of said drawbar, a plurality of cultivator units swingably connected in trailing relation to said draft bar, rockshaft means on said draft bar for adjusting the operating position of said cultivator units, detachable means connecting said rockshaft means with said drawbar, whereby movement of the latter through one stage of movement serves to adjust said cultivator units, a transverse stabilizing bar shiftably connected with said units, an attaching member pivotally connected with said stabilizing bar, and means for detachably connecting said ataching member with said tractor drawbar whereby vertical movement of the latter through the second stage of movement thereof serves to raise said stabilizing bar and said cultivator units.

7. In the combination of a tractor having a rear vertically swingable drawbar, an implement comprising a draft bar adapted to be connected to the tractor forwardly of said drawbar, and a plurality of cultivator units swingably connected in trailing relation to said draft bar, a transverse stabilizing bar shiftably connected with said units, means for connecting said stabilizing bar with the tractor drawbar comprising a vertically slotted member fixed to said stabilizing bar, a part movable in the slot in said member, means for attaching said part to said drawbar, whereby upward movement of the latter acts through said part, slotted member and said stabilizing bar to raise said cultivator units, and means also connected with the tractor drawbar and operated by movement thereof when said part moves freely in said slot for adjusting the operating depth of said cultivator units.

8. A lister cultivator comprising a mobile support, a plurality of cultivator gangs, each including an adjustable part, a stabilizing bar supported on said gangs and serving to stabilize the latter, draft means connecting each gang with said mobile support, means rockably mounted on said stabilizing bar, means for rocking said last mentioned means, motion-transmitting means connecting said rockably mounted means with each adjustable part, whereby operation of said rockably mounted means serves to move said adjustable parts, and movable means on said mobile support, motion-transmitting means connecting said movable means with said stabilizing bar for raising the latter and said gangs relative to said mobile support, said motion-transmitting means including means simultaneously engageable with said stabilizing bar at laterally spaced points so as to hold said stabilizing bar against rocking movement.

9. A lister cultivator comprising a plurality of lister cultivator gangs, each comprising a truck frame having rearwardly extending tool means connected therewith, means for tilting said truck frame so as to raise said tool means, a shield pivotally connected at its forward portion with said truck frame, an upwardly extending bar-receiving means, a transverse stabilizing bar carried by the upwardly extending means on said gangs, rockshaft means mounted for rocking movement on said stabilizing bar, means connecting said rockshaft means with said shield for raising and lowering the latter by movement of said rockshaft means, a downwardly extending arm fixed to the generally central portion of said stabilizing bar, and vertically movable and laterally rigid means connected with said arm for holding said stabilizing bar against lateral movement, said vertically movable means including parts engaging said stabilizing bar at laterally spaced points, thereby holding said stabilizing bar against rocking movement in said bar-receiving means.

10. The invention set forth in claim 7, further characterized by a transverse abutment on said part engageable with a part on said stabilizing bar for limiting pivotal movement of said stabilizing bar relative to said member when said bar and cultivator units are raised.

11. In a lister cultivator adapted to be attached to a mobile support having a raising member, a plurality of cultivator units arranged in side by side relation, a transverse stabilizing bar connected with said cultivator units, an attaching member adapted to be connected to said raising member and having a rear extension disposed generally centrally of said mobile support, a part on the central portion of said stabilizing bar pivotally receiving said rear extension and providing for both pivotal and generally vertical movement of said bar relative to said rear extension, and laterally extending means on said extension adapted to engage the central portion of said stabilizing bar for limiting pivotal movement of the latter relative to said rear extension and said attaching member.

12. In a lister cultivator, a plurality of cultivator units arranged in side by side relation, a transverse stabilizing bar, means connecting said unit with said bar for shifting movement relative thereto, a slotted part carried by the central portion of said bar, a lifting member movable in said slotted part from a position accommodating pivoting of said stabilizing bar relative thereto to a position in which said lifting member raises said stabilizing bar and said cultivator units, and laterally extending means on said lifting member engageable with said stabilizing bar laterally outwardly of said slotted part for limiting the pivotal movement of said stabilizing bar relative to said lifting member.

13. In a lister cultivator adapted to be mounted on a tractor having a power-actuated part movable from one position to another and through the latter to a third position, a plurality of lister cultivator gangs, each including a truck frame having rearwardly extending tool means and upwardly extending bar-receiving means, said truck frames being adapted to be tilted to raise and lower the tool means for adjusting the operating depth thereof, a transverse stabilizing bar carried by said bar-receiving means, a slotted part depending from the central portion of said stabilizing bar, a raising member adapted to be connected with said power-actuated part and shiftable thereby generally vertically and having a portion disposed in and shiftable relative to the slot in said slotted member, said raising member being adapted, when said power-actuated part has been shifted from said one position to said other position, to engage said stabilizing bar for raising the latter and said gangs when said power-actuated part has been shifted into said third position, means connected with said truck frames for tilting the latter to raise and lower said tool means, and means for connecting said tilting means with said power-actuated part so as to be operated by movement of the latter from said one position to another position to tilt said truck frames, said raising member in the lower position of said slotted part being adapted to accommodate the movement of said raising member in said slot when said power-actuated part moves from said one position to said other position.

THEODORE W. JOHNSON.

REFERENCES CITED

The following references are of record in the file of this patent:

UNITED STATES PATENTS

| Number | Name | Date |
|---|---|---|
| 714,915 | Keithly | Dec. 2, 1902 |
| 1,946,686 | Graham et al. | Feb. 13, 1934 |
| 2,045,209 | Thomas | June 23, 1936 |
| 2,092,589 | Scarlett | Sept. 7, 1937 |
| 2,140,144 | Silver | Dec. 13, 1938 |
| 2,171,031 | Graham et al. | Aug. 29, 1939 |
| 2,196,037 | Silver | Apr. 2, 1940 |
| 2,323,683 | Silver | July 6, 1943 |
| 2,335,175 | Davenport | Nov. 23, 1943 |
| 2,357,847 | Ray | Sept. 12, 1944 |
| 2,383,386 | Hipple | Aug. 21, 1945 |